US007097071B2

United States Patent
Anderson et al.

(10) Patent No.: US 7,097,071 B2
(45) Date of Patent: Aug. 29, 2006

(54) DISPENSER CONTAINER TECHNOLOGY

(76) Inventors: Mark L Anderson, 303 S. McKay Ave., Spring Valley, WI (US) 54767; John Harmon, N606 Country Rd. D, Elmwood, WI (US) 54740; Wayne Wellstein, 2219 9th, Menomonie, WI (US) 54751

( * ) Notice: Subject to any disclaimer, the term of this patent is extended or adjusted under 35 U.S.C. 154(b) by 342 days.

(21) Appl. No.: 10/663,932

(22) Filed: Sep. 16, 2003

(65) Prior Publication Data

US 2005/0056660 A1    Mar. 17, 2005

(51) Int. Cl.
  *G01F 11/28*  (2006.01)
  *B67D 5/38*   (2006.01)
(52) U.S. Cl. ............... 222/1; 222/158; 222/205; 222/438; 222/442
(58) Field of Classification Search ............ 222/1, 222/158, 205, 207, 438, 439, 442, 481.5
See application file for complete search history.

(56) References Cited

U.S. PATENT DOCUMENTS

| | | | | |
|---|---|---|---|---|
| 4,143,794 A | * | 3/1979 | Stratford et al. | 222/42 |
| 5,363,991 A | * | 11/1994 | Reyman | 222/207 |
| 5,570,820 A | * | 11/1996 | Amoraal | 222/205 |
| 6,330,960 B1 | * | 12/2001 | Faughey et al. | 222/205 |
| 6,334,550 B1 | * | 1/2002 | De Backer | 222/205 |

FOREIGN PATENT DOCUMENTS

| | | |
|---|---|---|
| AU | B-32530/00 | 11/2000 |
| NZ | 335985 | 8/2001 |

OTHER PUBLICATIONS (AA) Copy of photograph of apparatus in existence as of the filing date.
(AB) Copy of photograph of apparatus in existence as of the filing date.
(AC) Copy of photograph of apparatus in existence as of the filing date.
(AD) Copy of photograph of apparatus in existence as of the filing date.

* cited by examiner

Primary Examiner—Joseph A. Kaufman
(74) Attorney, Agent, or Firm—Skinner and Associates

(57) ABSTRACT

An apparatus for measuring and dispensing liquid from a container includes a measuring chamber having an inlet connected to the opening of the container. A cap member is rotatably attached to the measuring chamber. The cap member includes a dispensing outlet and a fill level member. A liquid delivery member is in fluid communication with the measuring chamber and the container. The fill level member is operatively associated with the liquid delivery member to deliver liquid from the container to the measuring chamber. By compressing the container, a volume of liquid is retained within the measuring chamber from flowing back into the container by the fill level member. The measured portion of liquid retained in the measuring chamber is available for dispensing from the dispensing outlet. A method for measuring and dispensing a measured portion of liquid from a container is also disclosed.

35 Claims, 6 Drawing Sheets

DISPENSER CONTAINER TECHNOLOGY

CROSS-REFERENCE TO RELATED APPLICATIONS, IF ANY

Not applicable.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates, generally, to apparatus and methods of measuring a volume of liquid. More particularly, the invention relates apparatus and methods for measuring and dispensing a volume of liquid. Most particularly, the invention relates to an apparatus and method for measuring and dispensing a volume of liquid from a container for animal or human medical treatment purposes.

2. Background Information

Various measuring devices are known in the technology whereby medicament or other fluid is displaced from a container into a measuring vessel. The background technology, in general, includes apparatus and methods for measuring and dispensing a volume of liquid from a container. This technology is believed to have significant limitations and shortcomings, including but not limited to:
  a. the complex mechanical devices used for measuring and dispensing a volume of liquid from a container; and
  b. the lack of accuracy in measuring the volume of liquid to be dispensed, due to the subjectiveness of determining when the dispenser is filled to a selected level.

For this and other reasons, a need exists for the present invention.

The invention provides a measuring dispenser device which is believed to fulfill the need and to constitute an improvement over the background technology.

All U.S. patents and patent applications, and all other published documents mentioned anywhere in this application are incorporated by reference in their entirety.

BRIEF SUMMARY OF THE INVENTION

The present invention provides an apparatus and method for measuring and dispensing a volume of liquid from a container.

In one embodiment, the apparatus includes a measuring chamber having an inlet connected to the opening of the container. A cap member is rotatably attached to the measuring chamber, the cap member including a dispensing outlet and a fill level member. A liquid delivery member is in fluid communication with the measuring chamber and the container. The fill level member is operatively associated with the liquid delivery member to deliver liquid from the container to the measuring chamber. By compressing the container, a volume of liquid equal to the measured portion is retained within the measuring chamber from flowing back into the container by the fill level member. The measured portion of liquid retained in the measuring chamber is available for dispensing from the dispensing outlet.

In a preferred embodiment of the apparatus, the liquid delivery member comprises a cylindrical C-shaped member having a central slot and an annular channel there through. The slot and the annular channel are in fluid communication with the container. The fill level member comprises a cylindrical member co-axial with the liquid delivery member and exterior thereto, with the fill level cylindrical member secured at one end to the cap member. The fill level member includes a plurality of vertically non-aligned apertures and a vertically non-aligned notch at an end opposite the cap member. The cap member includes a tab member providing an indication of alignment of each fill level member aperture and notch upon rotation of the cap member. Also present is a burp valve member positioned interior the fill level member. The valve member comprises a disk member with a first air vent aperture in communication with the annular channel of the cylindrical C-shaped member. The disk member is held in a constant orientation on the cylindrical C-shaped member. The cap member includes a second air vent aperture, which is alignable with the first air vent aperture of the disk member.

In another embodiment, a method for measuring and dispensing a measured portion of liquid from a container with an opening is disclosed, employing the measuring and dispensing apparatus of the present invention.

The features, benefits and objects of the invention will become clear to those skilled in the art by reference to the following description, claims and drawings.

DETAILED DESCRIPTION

The measuring and dispensing apparatus of the present invention is coupled with a suitable liquid container. The apparatus can be employed as a pour-on system for veterinary medical treatment of animals, for example dosing treatment of ecoparasites in animals. This technology is also suitable for human medical dosing or other uses. This technology is also suitable for various other, non-medical or non-veterinary medical, uses.

The container and apparatus functions to store a liquid, measure a selected volume of liquid, which is adjustably variable, and dispense the measured liquid volume. The apparatus drains 100% of the measured volume upon dispensing the liquid.

Figure 1:
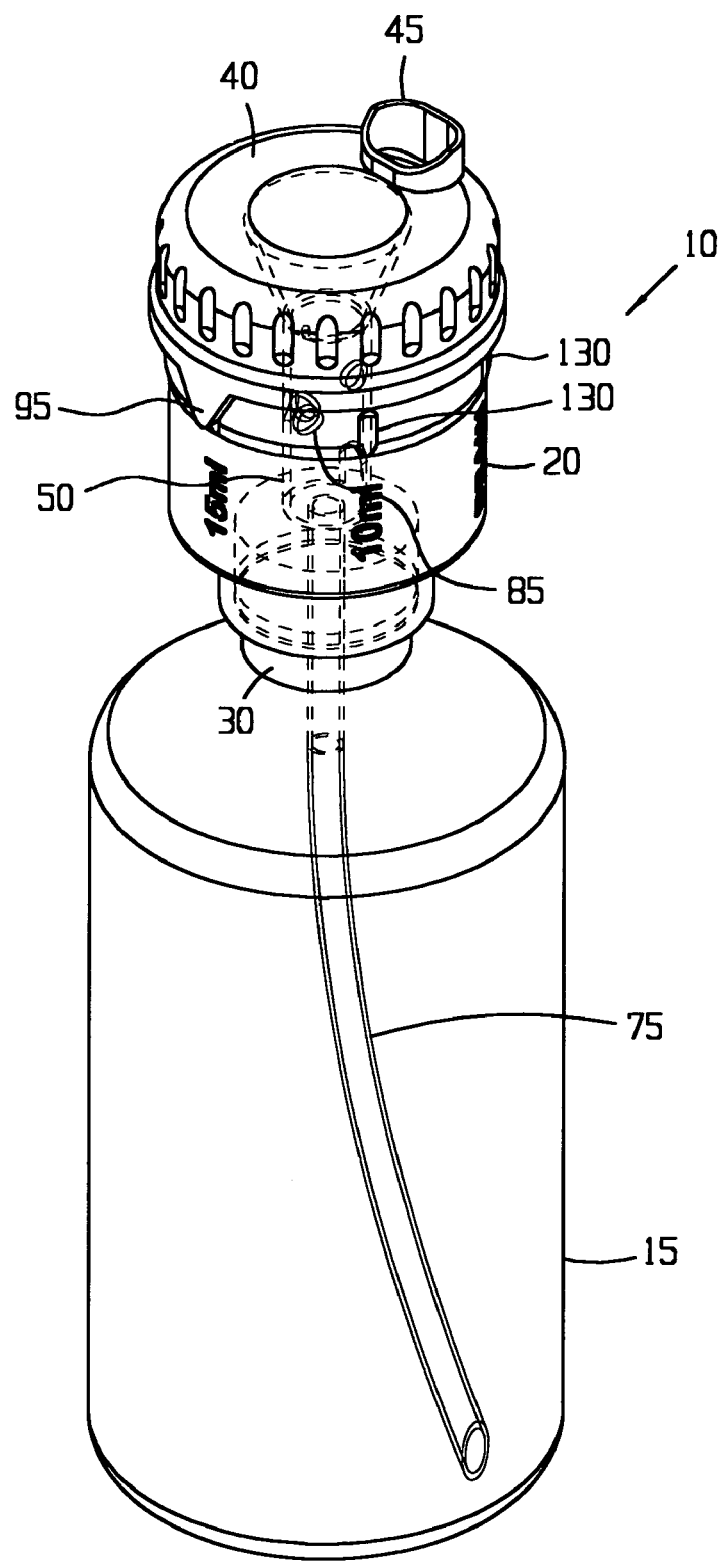
FIG. 1 is a perspective view of a container with the attached measuring and dispensing apparatus of the present invention.

FIG. 1 shows an embodiment of the present invention, generally indicated by the reference numeral 10. The apparatus 10 for dispensing a measured portion of liquid from a container is described below, first in terms of its major structural elements and then in terms of its secondary structural and/or functional elements that cooperate to perform the measuring and dispensing functions.

Referring to FIG. 1, the present invention is an apparatus 10 and a method for dispensing a measured portion of liquid from a container 15. In one embodiment, the apparatus 10 includes a measuring chamber 20 having an inlet 25 connected to the opening of the container 15. The inlet 25 includes, for example, a threaded cap member 30 that engages a threaded neck portion 35 of the container 15. A cap member 40 is rotatably attached to the top of the measuring chamber 20, opposite the inlet 25. The cap member 20 is freely rotatable around the top lip 22 of the measuring chamber 20. The cap member 20 is removeably attached to the measuring chamber 20 by engagement of an annular skirt 42, located around the periphery of the cap member 20, with the top lip 22 of the measuring chamber 20. The top lip 22 is best seen in FIG. 2, and the annular skirt 42 in FIG. 10.

The cap member 40 includes a dispensing outlet 45 and a fill level member 50. A liquid delivery member 55 is in fluid communication with the measuring chamber 20 and the container 15. The fill level member 50 is operatively associated with the liquid delivery member 55 to deliver liquid from the container 15 to the measuring chamber 20. By compressing the container 15, a volume of liquid equal to the measured portion is delivered to the measuring chamber 20 and retained from flowing back into the container 15 by the fill level member 50. The measured portion of liquid retained in the measuring chamber 20 is available for dispensing from the dispensing outlet 45 in the cap member 40.

Figure 2:
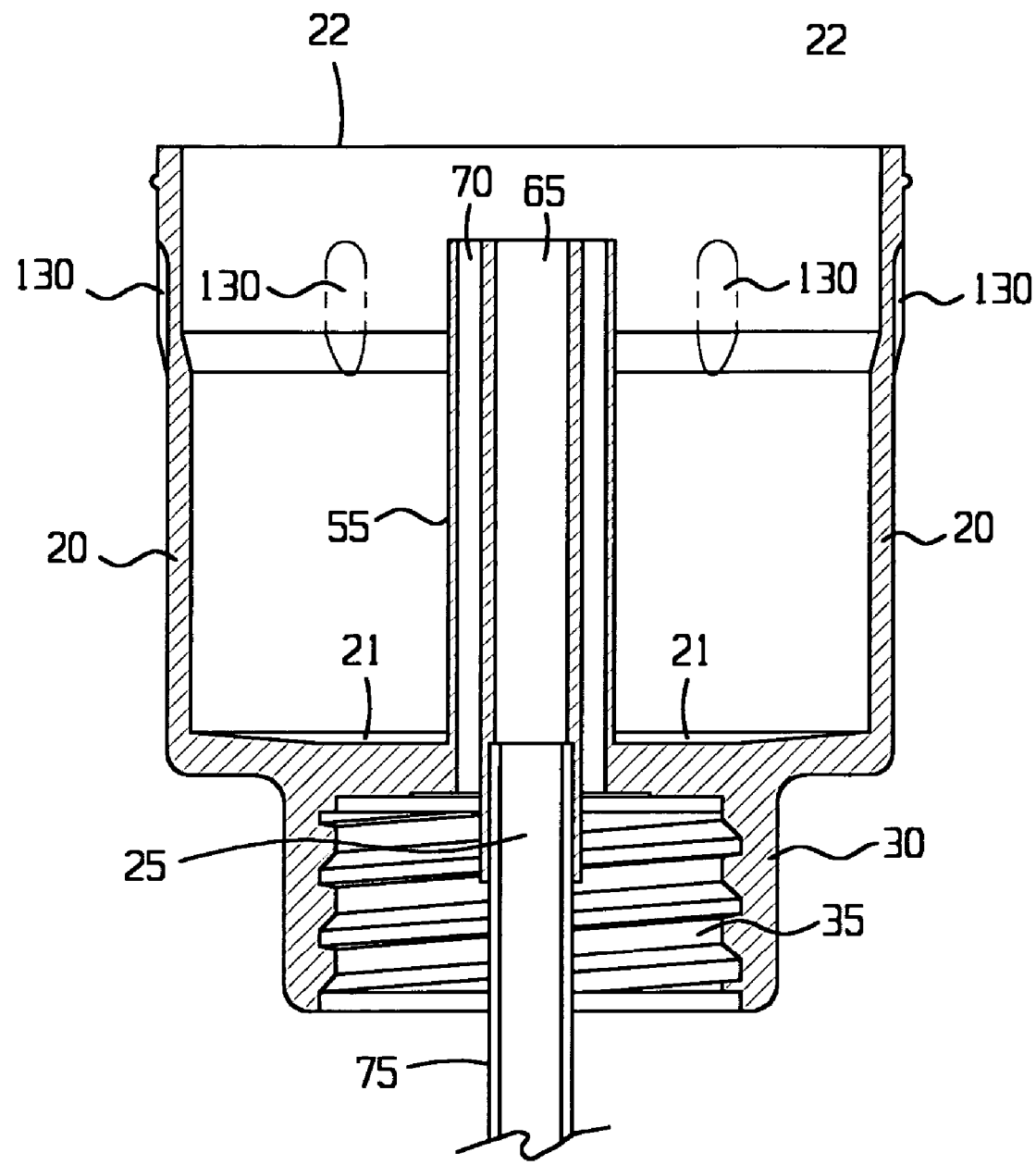
FIG. 2 is a cross sectional view of the measuring chamber of the measuring and dispensing apparatus of the present invention.
Figure 3:
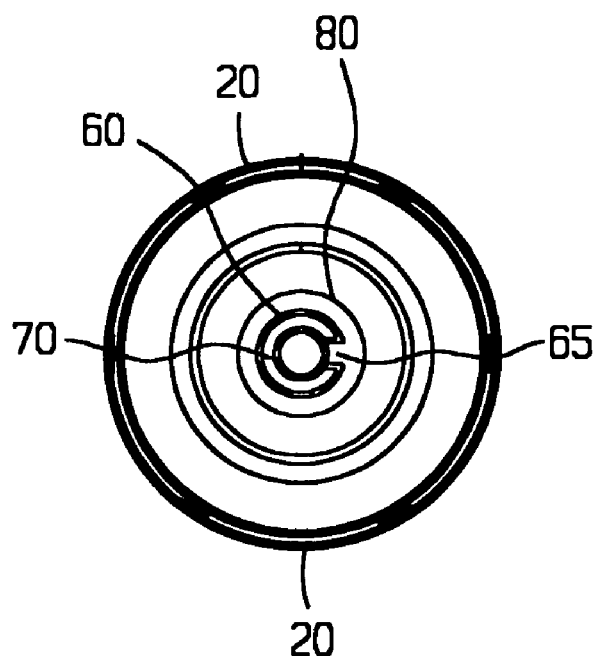
FIG. 3 is a top view of the measuring chamber of the measuring and dispensing apparatus of the present invention.
Figure 4:
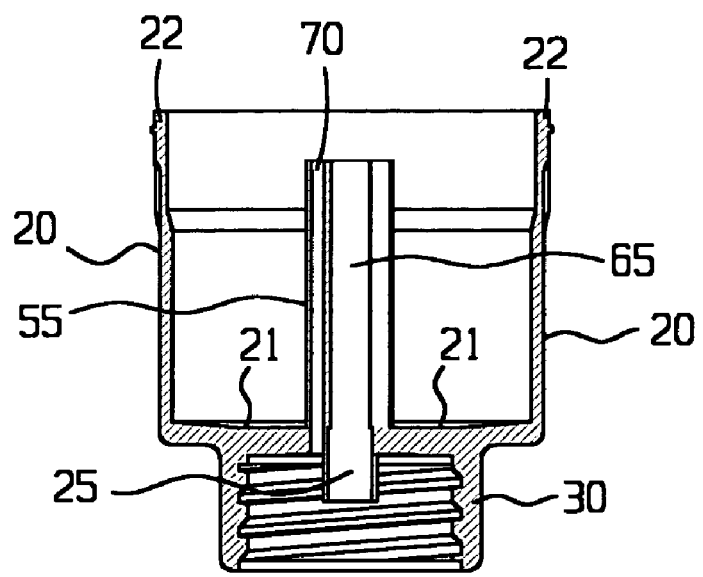
FIG. 4 is another cross sectional view of the measuring chamber of the measuring and dispensing apparatus of the present invention.
Figure 5:
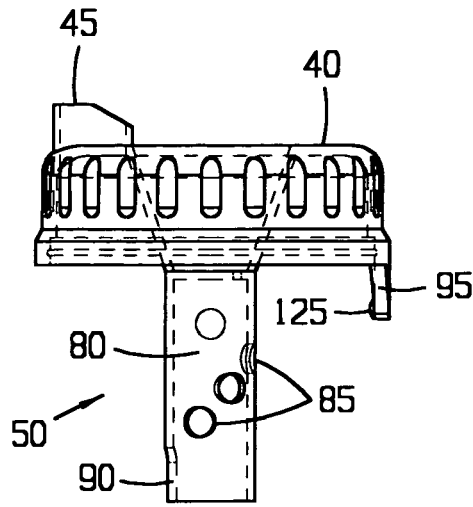
FIG. 5 is a perspective view of the cap member of the measuring and dispensing apparatus of the present invention.
Figure 6:
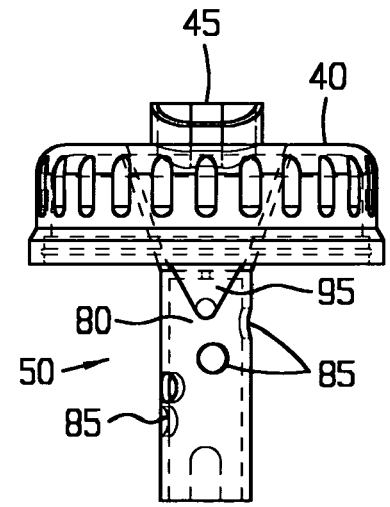
FIG. 6 is a perspective view of the cap member of FIG. 5 rotated 90 degrees clockwise.
Figure 7:
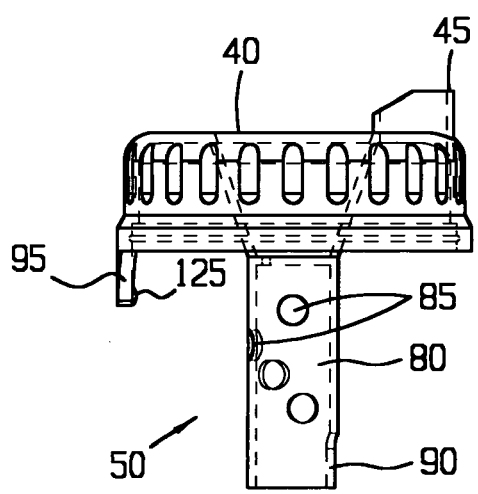
FIG. 7 is a perspective view of the cap member of FIG. 5 rotated 180 degrees clockwise.
Figure 8:
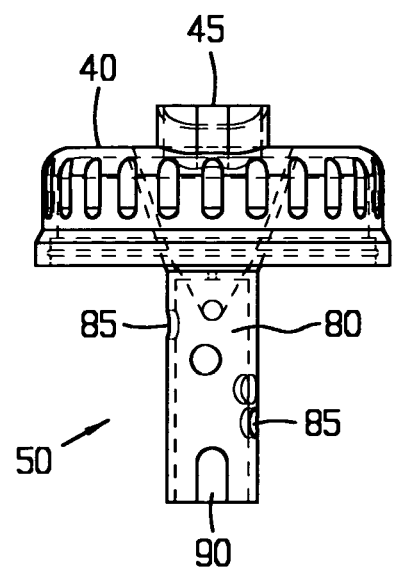
FIG. 8 is a perspective view of the cap member of FIG. 5 rotated 270 degrees clockwise.

In a preferred embodiment of the apparatus 10, the liquid delivery member 55 comprises a cylindrical C-shaped member 60, having a central slot 65 and an annular channel 70 there through, as illustrated in FIGS. 2–4. Preferably, the slot 65 extends axially from the base 21 of the measuring chamber 20 to the opposite end of the C-shaped member 60. The slot 65 and the annular channel 70 are in fluid communication with the container 15. A dip tube member 75 extends from the chamber inlet 25 to near the bottom of the container 15, below the liquid level therein, and is securely sealed to the chamber inlet 25, so that air in the container 15 cannot enter the chamber inlet 25 or the central slot 65. The annular channel 70 of the C-shaped member 60 is in fluid communication with the air space in the container 15, as shown in FIG. 4.

The fill level member 50 comprises a cylindrical tube member 80 co-axial with the liquid delivery member 55 and exterior thereto, with the cylindrical tube member 80 secured at one end to the cap member 40. The fill level, cylindrical tube member 80 includes a plurality of vertically non-aligned apertures 85 and a vertically non-aligned notch 90 at an end opposite the cap member 40. The cap member 40 further includes a tab member 95, providing an indication of alignment of each fill level member aperture 85 and notch 90 upon rotation of the cap member 40. Preferably, the tab member 95 is exterior the measuring chamber 20.

Figure 9:
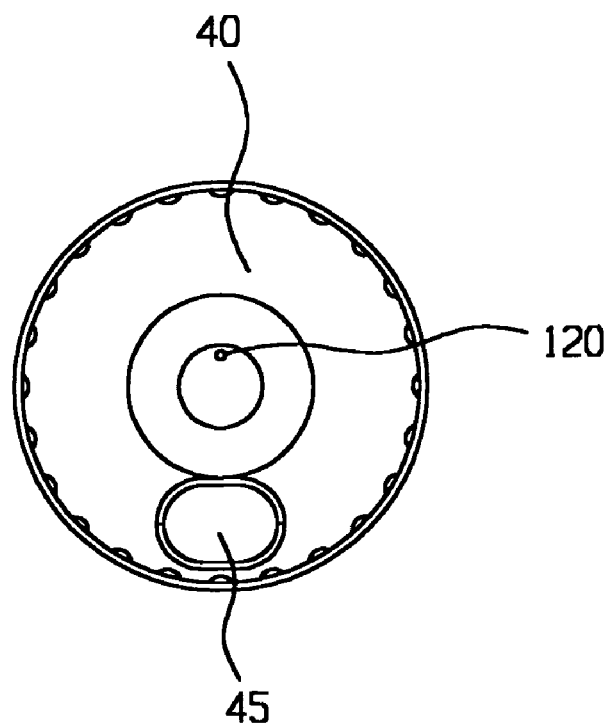
FIG. 9 is a top view of the cap member of the measuring and dispensing apparatus of the present invention.
Figure 10:
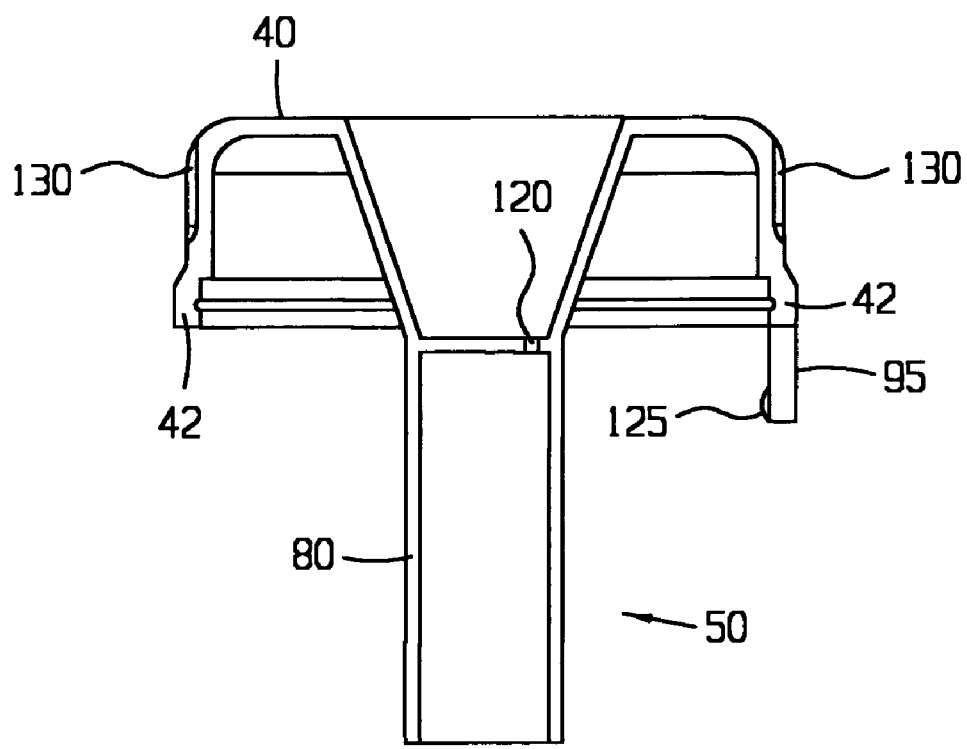
FIG. 10 is a sectional view of the cap member of the measuring and dispensing apparatus of the present invention.
Figure 11:
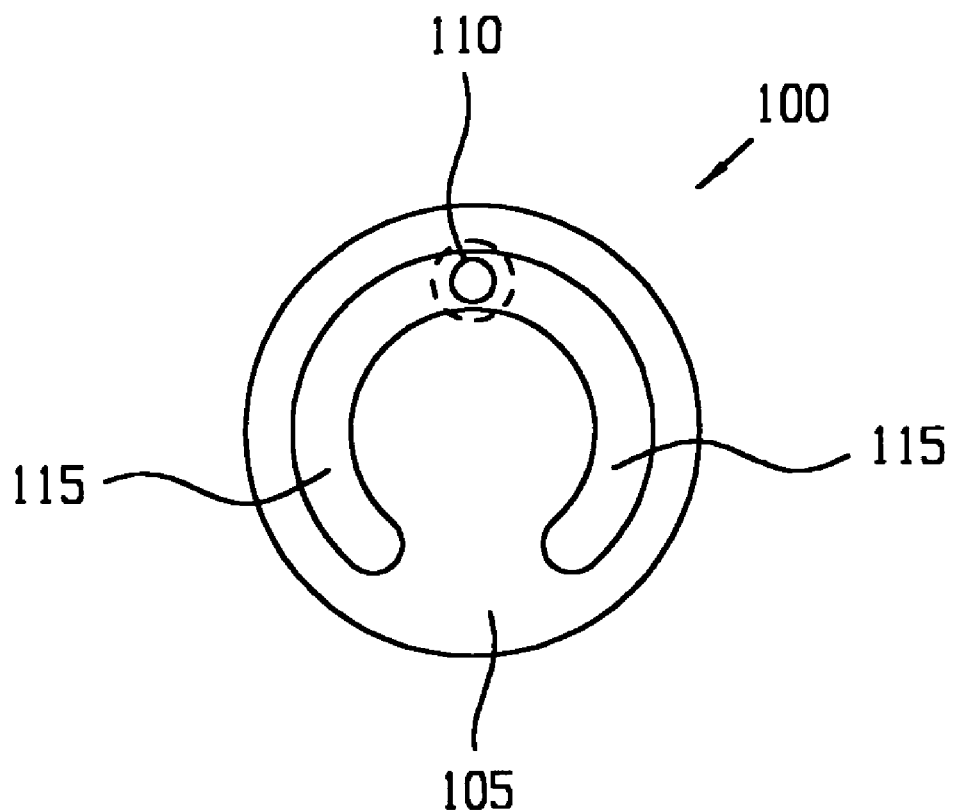
FIG. 11 is a top plan view of the burp valve member of the measuring and dispensing apparatus of the present invention.
Figure 12:
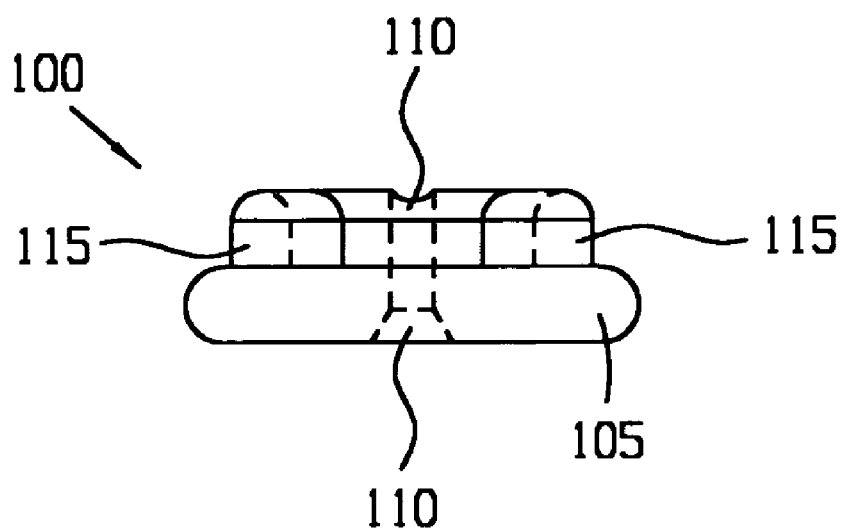
FIG. 12 is a sectional view of the burp valve member of the measuring and dispensing apparatus of the present invention.

Also present is a burp valve member 100 positioned interior the fill level member 50, shown in FIG. 11 and FIG. 12. The valve member 100 comprises a disk portion 105 with a first air vent aperture 110 in communication with the annular channel 70 of the cylindrical C-shaped member 60. The disk member 100 is held flat against the upper end of the cylindrical C-shaped member 60 and in a constant orientation there upon by a positioning portion 115 that mates with and seals the top of the annular channel 70. The cap member 40 includes a second air vent aperture 120, which is alignable with the first air vent aperture 110 of the disk portion 105, as illustrated in FIG. 9 and FIG. 10. The first and second air vent apertures 110, 120 are oriented such that rotation of the cap member 40 to align the two apertures results in positioning the notch 90 of the fill level member 50 over the central slot 65 of the liquid deliver member 55.

In a further embodiment of the invention, the tab member 95 extends downwardly from the cap member annular skirt 42, adjacent to the surface of the measuring chamber 20. The tab member 95 includes a protruding bump 125, and the measuring chamber 20 includes a plurality of surface depressions 130 for engaging the tab bump 125. Rotating the cap member 20 to engage the tab bump 125 with a selected surface depression 130 aligns an associated fill level member aperture 85 or notch 90 with the central slot 65 of the liquid delivery member 55. Engagement of the tab bump 125 in one of the surface depressions 130 ensures that an aperture 85 or notch 90 is positioned directly over the central slot 65.

Additionally, each surface depression 130 includes a numerical value, inscribed on the chamber surface, indicating the measured volume for the chamber 20 associated with the particular tab position.

In operation, the measuring and dispensing apparatus 10 is secured to an opening of a semi-flexible container 15 to provide an essentially airtight seal there between. As mentioned above, the apparatus 10 may include a threaded cap member 30 that engages the threaded neck portion 35 of the container 15. Alternatively, the apparatus 10 can be secured to the opening of the container 15 by friction fit attachment to provide an essentially airtight seal there between, with equivalent results. The container 15 and attached measuring and dispensing assembly 10 are held in an upright orientation during the process of measuring a selected volume of liquid to be dispensed by the assembly 10.

The dip tube member 75 extends from the chamber inlet 25, below the container liquid level, to near the bottom of the container 15 such that compressing the container 15 forces liquid through the dip tube member 75 to the chamber inlet 25 and the liquid delivery member 55. The burp valve member 100 seals the upper end of the annular channel 70 of the liquid delivery member 55, except for a particular situation, described later.

The fill level member 50 comprises a cylindrical tube member 80, secured at one end to the cap member 40. The cylindrical tube member 80 is co-axial and exterior to the liquid delivery member 55 and extends to the base 21 of the measuring chamber 20 to enclose the central slot 65 of the liquid delivery member 55. The cylindrical tube member 80 includes a plurality of vertically non-aligned apertures 85 at various elevations, relative to the base 21 of the measuring chamber 20. In addition, the cylindrical tube member 80 has a notch 90 at the end opposite the cap member 40. Rotation of the cap member 40 brings each aperture 85 and the notch 90, successively, into position over the central slot 65 of the liquid delivery member 55. Compressing the container 15 forces liquid up through the liquid delivery member 55, out one of the aligned apertures 85, and into the measuring chamber 20. The dispensing outlet 45 of the cap member 40 allows air to escape as the liquid enters the measuring chamber 20. Releasing the compression on the container 15 draws liquid from the measuring chamber 20 back through the aligned aperture 85 until the liquid level in the measuring chamber 20 is equal to the lower edge of the aperture 85. Air is then drawn into the container 15 through the aperture 85 until the container is fully expanded. Each aperture 85 is positioned on the fill level member 80 to provide a selected liquid volume retained in the measuring chamber 20, as illustrated in FIGS. 5–8. The measured volume of liquid is dispensed by inverting the container 15 and attached apparatus 10, allowing the liquid to flow out of the dispensing outlet 45 in the cap member 40. No internal elements impede the flow of liquid from the measuring chamber 20 through the dispensing outlet 45 of the cap member 40.

Should it be necessary to return liquid in the measuring chamber 20 to the container 15, the cap member 40 is rotated to bring the notch 90 of the fill level member 50 into alignment with the central slot 65 of the liquid delivery member 55. As noted above, this also aligns the first air vent 110 and second air vent 120 of the burp valve member 100 and cap member 40, respectively. This alignment allows air to escape from the container 15 through the annular chamber 70, as liquid from the measuring chamber 20 flows back into the container via the liquid delivery member 55 and the dip tube member 75.

The cap 40 may be actuated to a closed position wherein the apertures 85, notch 90, and vents 110 and 120 are closed.

The apparatus 10 is preferably fabricated from a rigid polymeric resin material. Most preferably, the resin material is essentially semitransparent, allowing the user to view the liquid in the measuring chamber 20, as well as ensure that the elements are functioning properly. The apertures 85 in the fill level member 50 provide a high degree of repeatability when changing between various selected volumes to be measured.

Also disclosed is a method for measuring and dispensing a measured portion of liquid from a container with an opening. The method includes the steps of:

(a) supplying a measuring and dispensing apparatus comprising:
 (i) a measuring chamber including an inlet connected to the opening of the container;
 (ii) a cap member rotatably attached to the measuring chamber, the cap member including a dispensing outlet and a fill level member; and
 (iii) a liquid delivery member in fluid communication with the measuring chamber and the container, the fill level member operatively associated with the liquid delivery member to deliver liquid from the container to the measuring chamber, wherein a volume of liquid equal to the measured portion is retained in the measuring chamber from flowing back into the container by the fill level member;

(b) securing the measuring and dispensing apparatus to the opening of the container;

(c) orienting the container and attached apparatus vertically with the apparatus above the container;

(d) compressing the container to deliver liquid from the container to the measuring chamber;

(e) releasing compression on the container to drain liquid in excess of the measured portion from the measuring chamber; and (f) inverting the container and attached apparatus to dispense the measured portion of liquid from the measuring chamber via the dispensing outlet in the cap member.

The descriptions above and the accompanying drawings should be interpreted in the illustrative and not the limited sense. While the invention has been disclosed in connection with an embodiment or embodiments thereof, it should be understood that there may be other embodiments which fall within the scope of the invention as defined by the claims. Where a claim, if any, is expressed as a means or step for performing a specified function, it is intended that such claim be construed to cover the corresponding structure, material, or acts described in the specification and equivalents thereof, including both structural equivalents and equivalent structures, material-based equivalents and equivalent materials, and act-based equivalents and equivalent acts.

What is claimed is:

1. An apparatus for dispensing a measured portion of liquid from a container with an opening, the apparatus comprising:
 (a) a measuring chamber including an inlet connected to the opening of the container;
 (b) a cap member rotatably attached to the measuring chamber, the cap member including a dispensing outlet and a fill level member;
 (c) a liquid delivery member in fluid communication with the measuring chamber and the container, the fill level member operatively associated with the liquid delivery member to deliver liquid from the container to the measuring chamber, wherein a volume of liquid equal to the measured portion is retained therein from flowing back into the container by the fill level member, the measured portion of liquid available for dispensing from the dispensing outlet;
 (d) wherein the fill level member comprises a cylindrical tube member co-axial with the liquid delivery member and exterior thereto, the cylindrical tube member secured at one end to the cap member, and extending the length of the liquid delivery member;
 (e) wherein the cylindrical tube member includes a plurality of vertically non-aligned apertures therein, each aperture alignable with the central slot of the liquid delivery member; and
 (f) wherein the cylindrical tube member includes a notch at an end opposite the cap member, the notch vertically non-aligned with the non-aligned apertures therein, the notch alignable with the central slot of the liquid delivery member.

2. The apparatus for dispensing a measured portion of liquid of claim 1, wherein the liquid delivery member comprises a cylindrical C-shaped member having a central slot and an annular channel there through, the slot and the annular channel in fluid communication with the container.

3. The apparatus for dispensing a measured portion of liquid of claim 2, wherein the central slot extends axially the length of the liquid delivery member.

4. The apparatus for dispensing a measured portion of liquid of claim 2, further including a dip tube member with a first end sealingly secured to the measuring chamber inlet, the dip tube member with a second end extending into the container.

5. The apparatus for dispensing a measured portion of liquid of claim 1, wherein the apertures are circular.

6. The apparatus for dispensing a measured portion of liquid of claim 1, further including a burp valve member secured in the cap member.

7. The apparatus for dispensing a measured portion of liquid of claim 6, wherein the burp valve member is positioned interior the fill level member and the valve member is in fluid communication with the annular channel of the cylindrical C-shaped member.

8. The apparatus for dispensing a measured portion of liquid of claim 6, wherein the burp valve member comprises a disk member with a first air vent aperture in communication with the annular channel of the cylindrical C-shaped member, the disk member held in a constant orientation on the cylindrical C-shaped member, the cap member including a second air vent aperture alignable with the first air vent aperture of the disk member.

9. The apparatus for dispensing a measured portion of liquid of claim 8, wherein the notch in the fill level cylindrical member is aligned with the central slot of the liquid delivery C-shaped member concurrent with alignment of the burp valve air aperture and the cap member air vent aperture.

10. The apparatus for dispensing a measured portion of liquid of claim 1, further including a tab member secured to the cap member, the tab member providing an indication of alignment of each fill level member aperture and notch with the central slot of the liquid delivery member, upon rotation of the cap member.

11. The apparatus for dispensing a measured portion of liquid of claim 10, wherein the tab member is exterior the measuring chamber.

12. The apparatus for dispensing a measured portion of liquid of claim 11, wherein the tab member includes a tab bump, and the measuring chamber includes a plurality of surface depressions for engaging the tab bump, whereby rotating the cap member to engage the tab bump with a selected surface depression aligns an associated fill level member aperture or notch with the central slot of the liquid delivery member.

13. An apparatus for dispensing a measured portion of liquid from a container with an opening, the apparatus comprising:
(a) a measuring chamber including an inlet connected to the opening of the container;
(b) a cap member rotatably attached to the measuring chamber, the cap member including a dispensing outlet and a fill level member including a cylindrical tube member secured at one end to the cap member;
(c) a liquid delivery member in fluid communication with the measuring chamber and the container, the liquid delivery member comprising a cylindrical C-shaped member having a central slot and an annular channel there through, the slot and the annular channel in fluid communication with the container, the fill level member operatively associated with the liquid delivery member to deliver liquid from the container to the measuring chamber, wherein a volume of liquid equal to the measured portion is retained therein from flowing back into the container by the fill level member, the measured portion of liquid available for dispensing from the dispensing outlet;
(d) wherein the cylindrical tube member includes a plurality of vertically non-aligned apertures therein, each aperture alignable with the central slot of the liquid delivery member; and
(e) wherein the cylindrical tube member includes a notch at an end opposite the cap member, the notch vertically non-aligned with the non-aligned apertures therein, the notch alignable with the central slot of the liquid delivery member.

14. The apparatus for dispensing a measured portion of liquid of claim 13, wherein the central slot extends axially the length of the liquid delivery member.

15. The apparatus for dispensing a measured portion of liquid of claim 13, further including a dip tube member with a first end sealingly secured to the measuring chamber inlet, the dip tube member with a second end extending into the container.

16. The apparatus for dispensing a measured portion of liquid of claim 13, wherein the cylindrical fill level member is coaxial with the cylindrical C-shaped liquid delivery member, extends the length of the liquid delivery member, and is exterior thereto.

17. The apparatus for dispensing a measured portion of liquid of claim 13, wherein the apertures are circular.

18. The apparatus for dispensing a measured portion of liquid of claim 13, further including a burp valve member secured in the cap member.

19. The apparatus for dispensing a measured portion of liquid of claim 18, wherein the burp valve member is positioned interior the fill level member and the valve member is in fluid communication with the annular channel of the cylindrical C-shaped member.

20. The apparatus for dispensing a measured portion of liquid of claim 18, wherein the burp valve member comprises a disk member with a first air vent aperture in communication with the annular channel of the cylindrical C-shaped member, the disk member held in a constant orientation on the cylindrical C-shaped member, the cap member including a second air vent aperture alignable with the first air vent aperture of the disk member.

21. The apparatus for dispensing a measured portion of liquid of claim 20, wherein the notch in the fill level cylindrical member is aligned with the central slot of the liquid delivery C-shaped member concurrent with alignment of the burp valve air aperture and the cap member air vent aperture.

22. The apparatus for dispensing a measured portion of liquid of claim 13, further including a tab member secured to the cap member, the tab member providing an indication of alignment of each fill level member aperture and notch with the central slot of the liquid delivery cylindrical C-shaped member, upon rotation of the cap member.

23. The apparatus for dispensing a measured portion of liquid of claim 22, wherein the tab member is exterior the measuring chamber.

24. The apparatus for dispensing a measured portion of liquid of claim 23, wherein the tab member includes a tab bump, and the measuring chamber includes a plurality of surface depressions for engaging the tab bump, whereby rotating the cap member to engage the tab bump with a selected surface depression aligns an associated fill level member aperture or notch with the central slot of the liquid delivery member.

25. An apparatus for dispensing a measured portion of liquid from a container with an opening, the apparatus comprising:
(a) a measuring chamber including an inlet connected to the opening of the container;
(b) a cap member rotatably attached to the measuring chamber, the cap member including a dispensing outlet and a fill level member including a cylindrical tube member secured at one end to the cap member, the cylindrical fill level member including a plurality of vertically non-aligned apertures and a vertically non-aligned notch at an end opposite the cap member, the cap member including a tab member providing an indication of alignment of each fill level member aperture and notch upon rotation of the cap member;
(c) a liquid delivery member in fluid communication with the measuring chamber and the container, the liquid delivery member comprising a cylindrical C-shaped member having a central slot and an annular channel there through, the slot and the annular channel in fluid communication with the container, the fill level member operatively associated with the liquid delivery member to deliver liquid from the container to the measuring chamber;
(d) a dip tube member with a first end sealingly secured to the measuring chamber inlet, the dip tube member with a second end extending into the container; and
(e) a burp valve member positioned interior the fill level member of the cap member, the burp valve member in fluid communication with the annular channel of the cylindrical C-shaped member, wherein a volume of liquid equal to the measured portion is retained therein from flowing back into the container by the fill level member, the measured portion of liquid available for dispensing from the dispensing outlet.

26. The apparatus for dispensing a measured portion of liquid of claim 25, wherein the central slot extends axially the length of the liquid delivery member.

27. The apparatus for dispensing a measured portion of liquid of claim 25, wherein the cylindrical fill level member is coaxial with the cylindrical C-shaped liquid delivery member, extends the length of the liquid delivery member, and is exterior thereto.

28. The apparatus for dispensing a measured portion of liquid of claim 25, wherein the apertures are circular.

29. The apparatus for dispensing a measured portion of liquid of claim 25, wherein the burp valve member comprises a disk member with a first air vent aperture in communication with the annular channel of the cylindrical C-shaped member, the disk member held in a constant orientation on the cylindrical C-shaped member, the cap member including a second air vent aperture alignable with the first air vent aperture of the disk member.

30. The apparatus for dispensing a measured portion of liquid of claim 29, wherein the notch in the fill level cylindrical member is aligned with the central slot of the liquid delivery C-shaped member concurrent with alignment of the burp valve first air vent aperture and the cap member second air vent aperture.

31. The apparatus for dispensing a measured portion of liquid of claim 25, wherein the tab member is exterior the measuring chamber.

32. The apparatus for dispensing a measured portion of liquid of claim 31, wherein the tab member includes a tab bump, and the measuring chamber includes a plurality of surface depressions for engaging the tab bump, whereby rotating the cap member to engage the tab bump with a selected surface depression aligns an associated fill level member aperture or notch with the central slot of the liquid delivery member.

33. A method for measuring and dispensing a measured portion of liquid from a container with an opening, the method comprising the steps:
(a) supplying a measuring and dispensing apparatus comprising:
(i) a measuring chamber including an inlet connected to the opening of the container;
(ii) a cap member rotatably attached to the measuring chamber, the cap member including a dispensing outlet and a fill level member, the cap member having a burp valve; and
(iii) a liquid delivery member in fluid communication with the measuring chamber and the container, the fill level member operatively associated with the liquid delivery member to deliver liquid from the container to the measuring chamber, wherein a volume of liquid equal to the measured portion is retained in the measuring chamber from flowing back into the container by the fill level member;
(b) securing the measuring and dispensing apparatus to the opening of the container;
(c) orienting the container and attached apparatus vertically with the apparatus above the container;
(d) compressing the container to deliver liquid from the container to the measuring chamber;
(e) releasing compression on the container to drain liquid in excess of the measured portion from the measuring chamber; and
(f) inverting the container and attached apparatus to dispense the measured portion of liquid from the measuring chamber via the dispensing outlet in the cap member.

34. An apparatus for dispensing a measured portion of liquid from a container with an opening, the apparatus comprising:
(a) a measuring chamber including an inlet connected to the opening of the container;
(b) a cap member rotatably attached to the measuring chamber, the cap member including a dispensing outlet and a fill level member;
(c) a liquid delivery member in fluid communication with the measuring chamber and the container, the fill level member operatively associated with the liquid delivery member to deliver liquid from the container to the measuring chamber, wherein a volume of liquid equal to the measured portion is retained therein from flowing back into the container by the fill level member, the measured portion of liquid available for dispensing from the dispensing outlet; and
(d) further including a burp valve member secured in the cap member.

35. An apparatus for dispensing a measured portion of liquid from a container with an opening, the apparatus comprising:
(a) a measuring chamber including an inlet connected to the opening of the container;
(b) a cap member rotatably attached to the measuring chamber, the cap member including a dispensing outlet and a fill level member including a cylindrical tube member secured at one end to the cap member;
(c) a liquid delivery member in fluid communication with the measuring chamber and the container, the liquid delivery member comprising a cylindrical C-shaped member having a central slot and an annular channel there through, the slot and the annular channel in fluid communication with the container, the fill level member operatively associated with the liquid delivery member to deliver liquid from the container to the measuring chamber, wherein a volume of liquid equal to the measured portion is retained therein from flowing back into the container by the fill level member, the measured portion of liquid available for dispensing from the dispensing outlet; and (d) further including a burp valve member secured in the cap member.

* * * * *